United States Patent [19]

Savanella

[11] Patent Number: 5,044,653

[45] Date of Patent: Sep. 3, 1991

[54] AUTOMATIC TRACTOR-TRAILER EXHAUST COUPLING APPARATUS

[76] Inventor: James A. Savanella, 32 Clearview Ave., Harwinton, Conn. 06791

[21] Appl. No.: 514,162

[22] Filed: Apr. 25, 1990

[51] Int. Cl.5 .......................... B60D 1/62; B60D 53/08
[52] U.S. Cl. .................................... 280/421; 280/425.1
[58] Field of Search ..................... 237/12.3 A, 12.3 B, 237/12.3 C; 280/425.1, 433, 421, 420; 180/68.2

[56] References Cited

U.S. PATENT DOCUMENTS

| | | | |
|---|---|---|---|
| 2,118,884 | 5/1938 | Fuchs | 180/68.2 |
| 3,134,628 | 5/1964 | Lachey et al. | 280/421 |
| 4,719,372 | 3/1973 | Rawlings | 280/421 |
| 4,751,873 | 6/1988 | Johnston | 237/12.3 |

FOREIGN PATENT DOCUMENTS 0145012  11/1980  Japan .................................. 280/420

Primary Examiner—Charles A. Marmor
Assistant Examiner—Victor E. Johnson
Attorney, Agent, or Firm—McCormick, Paulding & Huber

[57] ABSTRACT

An automatic tractor-trailer exhaust coupling apparatus has a valve for diverting exhaust gases through a connecting conduit to a tractor coupling device. The tractor coupling device delivers the gases, irrespective of angular relationship between tractor and trailer, to a trailer coupling device which in turn passes the gases to the trailer heat transfer means. The tractor and trailer coupling devices automatically connect on engagement of the trailer fifth wheel with the trailer.

7 Claims, 2 Drawing Sheets

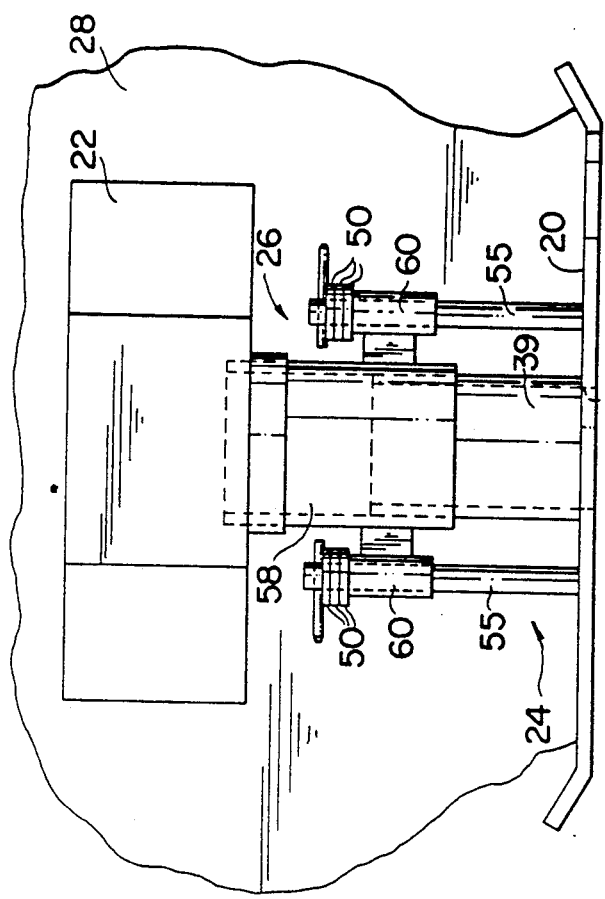
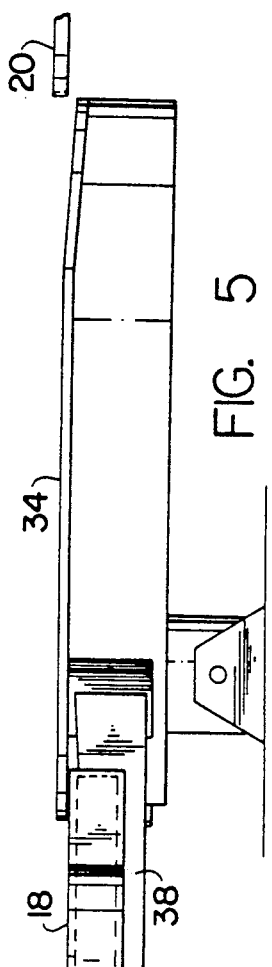
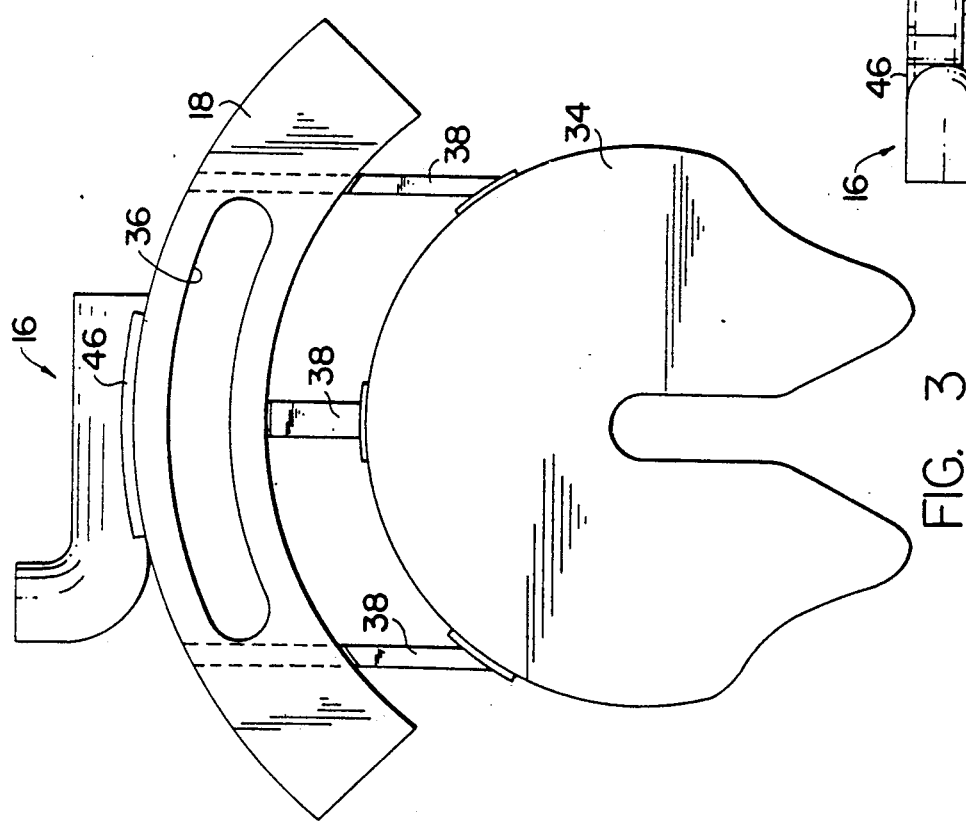

5,044,653

AUTOMATIC TRACTOR-TRAILER EXHAUST COUPLING APPARATUS

BACKGROUND OF THE INVENTION

This invention relates to apparatus for coupling the exhaust system of a truck or tractor to an associated trailer, and, more particularly, to apparatus for automatically coupling the exhaust system when the tractor is in operative relationship with the trailer.

It is well known in the art to use the exhaust gases from tractor exhaust systems to heat portions of a trailer. A dump truck in U.S. Pat. No. 3,134,628 issued to Lackey et al. accomplishes this with an elaborate exhaust coupling system having conduits, hinges, seals, etc. The exhaust coupling system is not only complicated and expensive but obviously difficult to assemble and operate. Moreover, the exhaust coupling system does not automatically connect when the tractor is connected in operative relationship with the trailer. Instead, the exhaust coupling system of Lackey et al can only be completely assembled and/or connected after the tractor and trailer are connected in operative relationship.

SUMMARY OF THE INVENTION

The present invention relates to automatic apparatus for diverting exhaust gases from a tractor having an engine exhaust system to a trailer having heat transfer means for transferring heat to portions of the trailer. Such tractors conventionally include a fifth wheel for engagement with a complementary connecting means on the trailer when the tractor is in operative relationship with the trailer, and the exhaust coupling apparatus automatically couples the tractor to the trailer only when the tractor and trailer are in operative relationship with each other. The apparatus of the present invention comprises a tractor mounted coupling device, a conduit connected between the engine exhaust system and the tractor mounted coupling device, and a trailer mounted coupling device connected to heat transfer means on the trailer. The tractor and trailer coupling devices respectively define exhaust gas discharge and inlet openings which automatically interface with each other when the tractor and trailer are in operative relationship with each other. This accommodates communication of exhaust gases from the exhaust system of the tractor through the connecting conduit and the openings in the tractor and trailer coupling devices to the heat transfer means of the trailer;

OBJECTS AND ADVANTAGES

Objects and advantages of the present invention are:

(a) to provide an inexpensive, relatively easy to assemble exhaust coupling apparatus for coupling an exhaust system of a tractor to the heat transfer means of an associated trailer;

(b) to provide an exhaust coupling apparatus which couples the exhaust system of the tractor to the heat transfer means of the trailer only when the tractor and trailer are in operative relationship with each other;

(c) to provide an exhaust coupling apparatus which provides for uninterrupted communication of exhaust gases between the tractor and trailer throughout the full extent of relative angular movement of the longitudinal centerlines of the tractor and trailer;

(d) to provide an exhaust coupling apparatus which automatically engages as the tractor and trailer are brought into operative relationship with each other.

BRIEF DESCRIPTION OF THE DRAWINGS

FIG. 3 is a top view of the fifth wheel and tractor mounted coupling device of the present invention.

FIG. 4 is a front view of the trailer mounted coupling device of the present invention attached to a heat transfer means.

FIG. 5 is a side view of the fifth wheel and tractor coupling device of FIG. 3.

DETAILED DESCRIPTION OF THE PREFERRED EMBODIMENT

Figure 1:
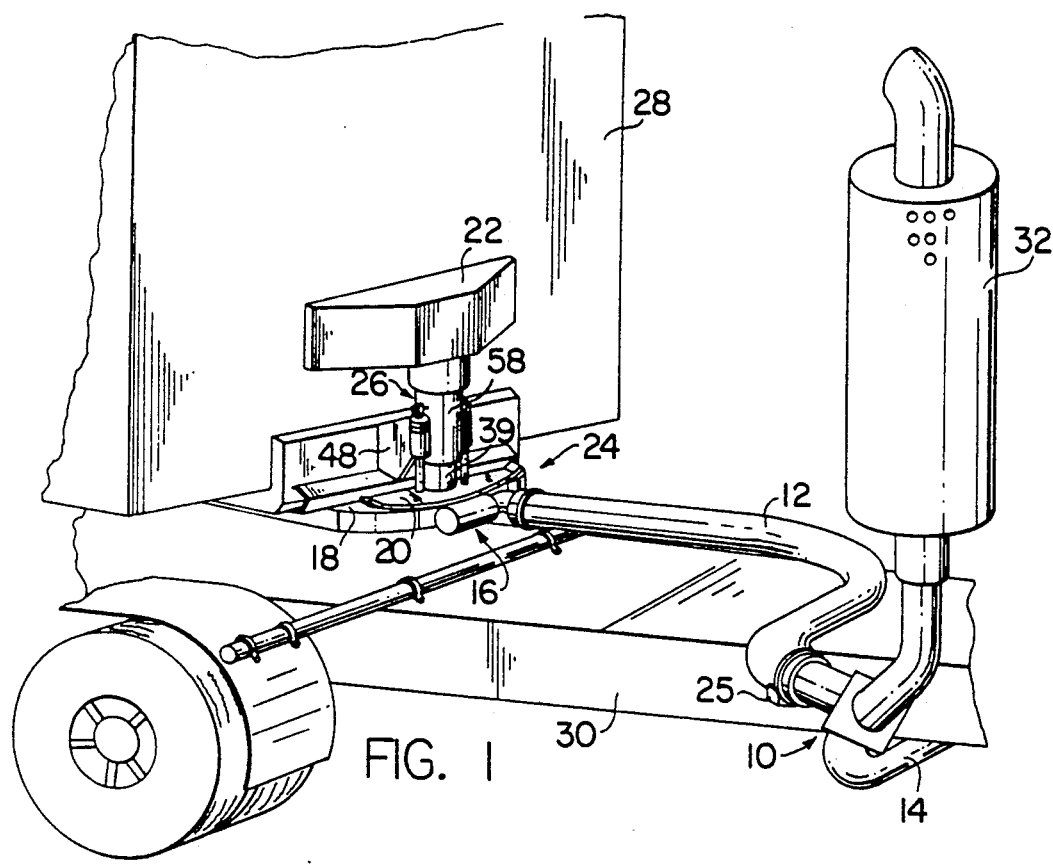
FIG. 1 is a perspective view of a preferred embodiment of the present invention connected to a tractor and trailer in operative relationship.
Figure 2:
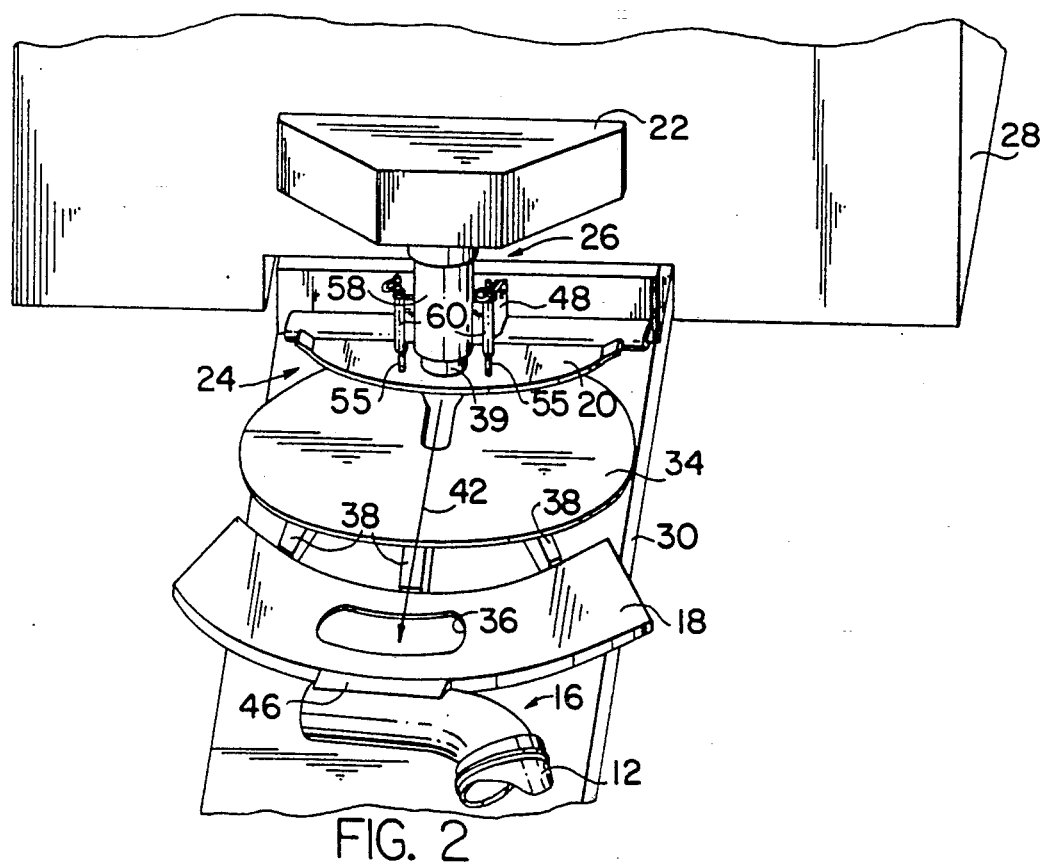
FIG. 2 is a further perspective view of the apparatus of FIG. 1 showing the exhaust coupling apparatus engaging as the trailer and the fifth wheel of the tractor are brought into engagement.

A preferred embodiment of the exhaust coupling apparatus of the present invention is illustrated in FIGS. 1-5. The exhaust coupling apparatus as best shown in FIGS. 1 and 2 comprises a first connection means 10, a conduit 12, a second connection means 16, a tractor mounted coupling device 18, and a trailer mounted coupling device 24. The first connection means 10 provides for selective three way communication between tractor engine exhaust system 14, exhaust stack 32 and exhaust gas conduit 12. The second connection means 16 provides for communication between the conduit 12 and tractor coupling device 18.

Trailer coupling device 24 includes coupling plate 20 and support means 26 for adjustably supporting the plate 20 in the vertical direction relative to the trailer 28. Support means 26 further comprises anchor plate 48 rigidly connected to the trailer 28 for mounting support means 26 on the trailer.

Tractor and trailer coupling devices 18, 24 have exhaust gas discharge and inlet openings 36, 37 (FIG. 3, 4) which interface when the tractor and trailer are in operative relationship with each other. Thus, exhaust gases are diverted from exhaust system 14 through connecting conduit 12 and the respective openings of the tractor and trailer coupling devices 18, 24 to heat transfer means 22.

The first connection means 10 may comprise a selectively operable manual valve (not shown) for controlling the direction of exhaust fumes between exhaust stack 32 and conduit 12. If it is unnecessary or undesirable to transfer heat to the trailer (or if the tractor and trailer are not in operative relationship) the valve in the connection means or housing 10 may be adjusted to direct the exhaust fumes to stack 32. If a transfer of heat to the trailer is desired (and the tractor and trailer are in operative relationship), the valve may be adjusted to route a portion or all of the exhaust gases through conduit 12.

Conduit 12 is preferably of the flexible type commonly used in vehicle exhaust systems. Alternatively, conduit 12 may be a preformed non-flexible exhaust pipe. To prevent problems with conduit 12 loosening due to vibration of the tractor-trailer, it may be desirable to secure the conduit to the frame of tractor 30 at a position intermediate its length via shock absorption means as at 25.

The second connection means 16 is preferably in the form of a ninety degree (90°) elbow and has two legs each having an opening. One leg is connected to the second end portion of conduit 12 and the other end is welded or otherwise connected to a small manifold 5 which forms a part of the tractor coupling device 18 and which communicates with the discharge opening 36 of the device. As best seen in FIG. 2, the second connection means 16 is rigidly welded at 46 to tractor coupling device 18.

Tractor coupling device 18 is supported by projecting members 38, 38 which are preferably welded to the fifth wheel 34. Discharge opening 36 is preferably of extended arcuate shape, and as illustrated inlet opening 37 is circular as defined by tubular member 39. As the tractor is brought into operative relationship with the trailer (see arrow 42 in FIG. 2) inlet opening 37 approaches discharge opening 36, and they interface with each other as the lower horizontal surface of trailer coupling plate 20 rides on the top of the upper horizontal surface of tractor coupling device 18. Once trailer 28 is locked into operative relationship with tractor 30 the said two openings are vertically aligned. The arcuate length of discharge opening 36 is sufficient to allow the openings to remain in communication throughout the full extent of relative angular movement of the longitudinal centerlines of the tractor 30 and trailer 28.

FIG. 4 shows in greater detail a preferred embodiment of trailer coupling device 24 and heat transfer means 22. The trailer coupling device 24 comprises support means 26 for adjustably supporting trailer coupling plate 20. Plate 20 carries inner sleeve or gas tube 39 and a pair of vertical support members 55, 55 rigidly attached to the base plate. Support means 26 is rigidly attached (preferably welded) to heat transfer means 22 and includes outer sleeve or gas tube 58 and a pair of small sleeves 60,60. As shown, sleeves 39 and 58 and sleeves 60,60 and members 55,55 telescopically interengage and accommodate slight vertical movement of the plate 20. To allow adjustment of the height of the plate 20 relative to the trailer (and also the fifth wheel and the tractor coupling device), washers 50,50 may be provided.

In FIG. 5 a side view of fifth wheel 34 and tractor coupling device 16 illustrates tractor coupling plate 18 attached to fifth wheel 34 so that its top surface is approximately one fourth (¼) inch below the top surface of fifth wheel 34. Thus, the plate 20 slidably engages the fifth wheel during interengagement and there-after descends into close engagement with the plate 18.

From the foregoing it will be apparent that an exhaust coupling apparatus of desirably simple construction has been provided. Automatic operation is yet highly efficient and dependable.

I claim:

1. Automatic tractor-trailer exhaust coupling apparatus for diverting exhaust gasses from a tractor having an engine and exhaust system to a trailer having heat transfer means for delivering heat to portions of the trailer, the tractor having a fifth wheel engageable on relative horizontal movement between the trailer and tractor into operational relationship with the trailer, and said exhaust coupling apparatus automatically establishing a conduit connection for the diversion of exhaust gases from the tractor exhaust system to the trailer heat transfer means when the fifth wheel is engaged and the tractor is in operational relationship with the trailer; said apparatus comprising:

an exhaust gas conduit having inlet and discharge end portions;

first connection means providing communication between the tractor exhaust system and the inlet end portion of the conduit;

a tractor mounted coupling device having a gas discharge opening and which is supported adjacent and projects forwardly from the fifth wheel of the tractor;

second connection means providing communication between the discharge end portion of the exhaust gas conduit and the tractor coupling device for the delivery of exhaust gases to said discharge opening;

a trailer coupling device on a front end portion of the trailer above and forwardly of the fifth wheel and having an exhaust gas inlet opening in communication with the trailer heat transfer means, said tractor and trailer coupling devices being fixed respectively relative to the tractor and trailer so as to be automatically interengaged on relative horizontal movement between the tractor and trailer when the tractor fifth wheel is engaged with the trailer and the tractor and trailer are in operational relationship with each other, the exhaust gas conduit and two coupling devices thus serving cooperatively to provide communication between the tractor exhaust system and the trailer heat transfer means, and said two coupling devices being adapted to maintain communication between said gas discharge and inlet openings throughout the full operational range of relative angular movement between the longitudinal centerlines of the tractor and trailer, and said trailer coupling device being adapted for independent limited vertical movement during interengagement of the two coupling devices, said trailer coupling device also including means biasing the device vertically downwardly toward the tractor coupling device.

2. Automatic tractor-trailer exhaust coupling apparatus as set forth in claim 1 wherein said two coupling devices provide for direct communication between said discharge and inlet openings, and wherein one of said openings has a cross-sectional configuration which is extended arcuately in a horizontal plane whereby to accommodate relative angular tractor-trailer movement as aforesaid.

3. Automatic tractor-trailer exhaust coupling apparatus as set forth in claim 2 wherein each of said coupling devices has a substantially flat and generally horizontal surface with the aforesaid discharge and inlet openings respectively defined in the horizontal surfaces of said tractor coupling device and said trailer coupling device, said two surfaces being automatically relatively slidable horizontally into operative engagement with said openings in vertical communication on engagement of the tractor fifth wheel with the trailer.

4. Automatic tractor-trailer exhaust coupling apparatus as set forth in claim 3 wherein at least one of said coupling devices includes a flat plate which defines its horizontal surface on one side and which also defines said arcuately extended opening, and wherein a horizontally extending manifold is provided adjacent said plate but on an opposite side thereof, said manifold serving to accommodate gas flow throughout the arcuate extend of the associated opening.

5. Automatic tractor-trailer exhaust coupling apparatus as set forth in claim 1 wherein said first connection means includes a valve for the selective diversion of exhaust gases from the tractor exhaust system to said exhaust gas conduit.

6. Automatic tractor-trailer exhaust coupling apparatus as set forth in claim 1 wherein a flexible exhaust gas conduit is provided.

7. Automatic tractor-trailer exhaust coupling apparatus as set forth in claim 4 wherein said tractor coupling device includes said arcuately extended opening.

* * * * *